Dec. 20, 1938.  E. P. BAILEY  2,140,663
INDOOR CLOTHESLINE FASTENER
Filed April 18, 1938
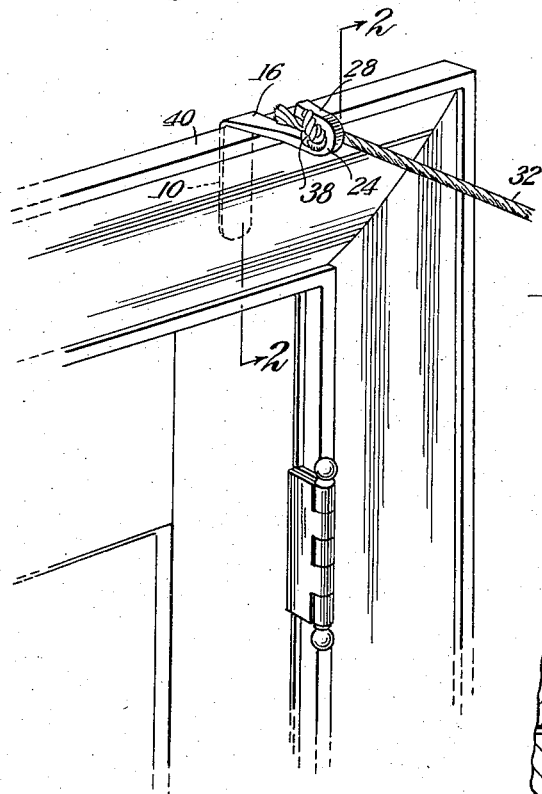
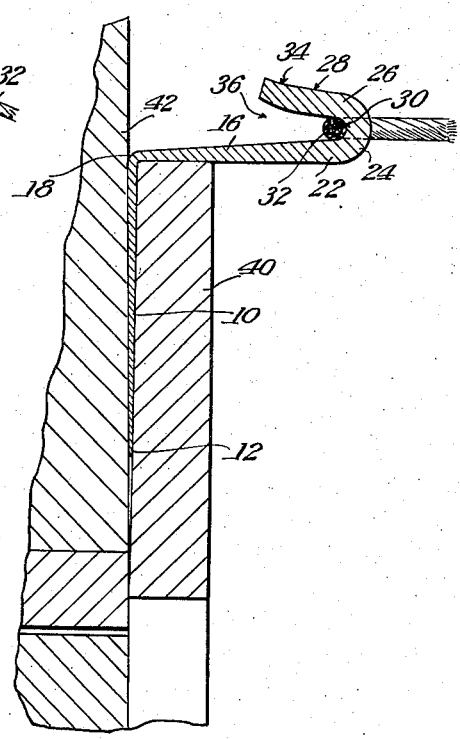
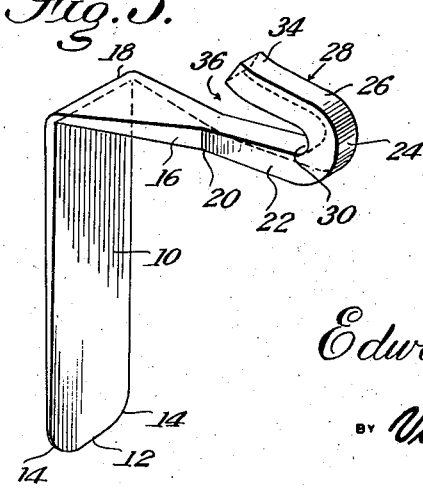
Edward P. Bailey.
INVENTOR
BY Victor J. Evans & Co.
ATTORNEYS Patented Dec. 20, 1938

2,140,663

UNITED STATES PATENT OFFICE 2,140,663

INDOOR CLOTHESLINE FASTENER

Edward P. Bailey, Ottawa, Ill.

Application April 18, 1938, Serial No. 202,800

3 Claims. (Cl. 24—130)

My invention relates to the mounting of clotheslines for indoor drying purposes and includes among its objects and advantages the provision of an improved indoor clothesline fastener.

An object of my invention is to provide an indoor clothesline fastener designed to be anchored to trims, such as are associated with doors and windows and in which the fastener may be anchored in such a manner as to prevent marring of the trim.

Another object is to provide a fastener in the nature of a hook including a blade shaped to be inserted between the trim and the wall and in which the blade is so proportioned as to perform an efficient supporting function without damage to the wall or trim structure.

Another object is to provide an indoor clothesline fastener in which the unit may be attached to wall trim and includes a novel hook which serves as an effective fastening for the line.

In the accompanying drawing:

Fig. 1 is a perspective view of a fragmentary wall and trim structure showing my indoor clothesline fastener associated therewith;

Fig. 2 is an enlarged sectional view along the line 2—2 of Fig. 1; and

Fig. 3 is a perspective view of the invention.

In the embodiment selected to illustrate my invention, the fastener comprising a blade 10 tapering to a feather edge 12, which edge is rounded to provide gentle curvatures 14. Blade 10 comprises an integral extension of the shank 16 and is bent at right angles thereto. Shank 16 and the blade 10 originally comprise a straight piece bent at 18 to position the blade at right angles to the shank. The shank and the blade are uniformly tapered in the direction of the feature edge 12 from the point 20, at which point the shank merges into the bar 22 which is rectangular in cross section.

Bar 22 is bent at 24 to provide a leg 26 cooperating therewith to provide the hook 28. Leg 26 lies in slightly converging relation with the bar 22 in the direction of the bight 30 which is curved and of a diameter substantially equal to the diameter of the conventional clothesline 32. The outer end of the leg 26 is bent outwardly at 34 to provide a thread 36 facilitating insertion of the line. In operation, the clothesline 32 may be knotted a 38, after which the line is pressed into the hook 28 and the knot pulled against one side of the hook. Since the line fits tightly inside the hook, the knot has such connected relation with the hook as to effectively support the line even though heavily loaded.

In Figs. 1 and 2, I illustrate the fastener anchored for supporting the clothesline. The blade 10 is inserted between the trim 40 and the wall 42. The blade is of sufficient length to secure firm anchorage for the hook in addition to being of such width as to have pressure relation with a considerable area of the wall 42, thus preventing damage thereto. Because of the thinness of the blade 10, it may be inserted easily between the trim 40 and the wall 42, and the shank 16 is of such width as to prevent damage to or marring of the trim 40. The taper of the blade 10 facilitates insertion, and after insertion, the blade is effectively pinched between the trim and the wall. At the same time, the feather edge in combination with the gentle curvatures 14 is so constructed as to prevent cutting of the wall or the trim. In tapering the shank 16 in the two directions illustrated in Fig. 3, the shank includes a width at its thinnest point represented by the bend 18 for lending strength and stiffness thereto.

While I have illustrated the line 32 as being provided with the knot 38, the hook performs equally well in connection with a line tied to form a loop for connection with the hook. My invention is particularly adapted to the mounting of clotheslines inside the house, and it is so designed as to utilize trim for anchoring purposes without damage thereto. The specific shape of the fastener embodies the necessary strength but at the same time is sturdy and well adapted for connection with trim, as illustrated in Figs. 1 and 2.

Without further elaboration, the foregoing will so fully explain my invention that others may, by applying current knowledge, readily adapt the same for use under various conditions of service.

I claim:

1. An indoor clothesline fastener comprising a hook, a blade, and a shank connecting the hook with the blade, said blade being so shaped as to be insertable between the wall trim and the wall, said blade being of uniform width but tapering to a feather edge from its point of connection with the shank, the width of said shank tapering in the direction of the hook and increasing in thickness in the same direction, the legs of said hook being rectangular in cross section.

2. An indoor clothesline fastener comprising a hook, a blade, and a shank connecting the hook with the blade, said blade being so shaped as to be insertable between the wall trim and the wall, said blade being of uniform width but tapering to a feather edge from its point of connection with the shank, the width of said shank tapering in the direction of the hook and increasing in thickness in the same direction, the legs of said hook being rectangular in cross section, the feather edge of said blade having rounded corners.

3. An indoor clothesline fastener comprising a hook, a blade, and a shank connecting the hook with the blade, said blade being tapered to a feather edge from its line of connection with the shank, said blade being of such thickness as to be insertable between the wall trim and the wall, the width of said shank tapering in the direction of the hook and increasing in thickness in the same direction, the width of the blade and the shank at their line of connection being such as to resist bending, to withstand normal forces effective thereon, the width of the shank adjacent its line of connection with the blade being such as to protect contacting trim from marring.

EDWARD P. BAILEY.